US008769528B2

(12) United States Patent (10) Patent No.: US 8,769,528 B2
Lam et al. (45) Date of Patent: Jul. 1, 2014

(54) FIXED-FUNCTION CONSUMER-ELECTRONICS DEVICE PROVIDING GENERAL-COMPUTING FUNCTIONS WITH VIRTUAL MACHINES

(75) Inventors: Monica Sin-Ling Lam, Menlo Park, CA (US); Kelvin Kam-Suen Yue, Sunnyvale, CA (US); Won-Suk Chun, Belmont, CA (US); Constantine P. Sapuntzakis, Mountain View, CA (US)

(73) Assignee: Moka5, Inc., Redwood City, CA (US)

(*) Notice: Subject to any disclaimer, the term of this patent is extended or adjusted under 35 U.S.C. 154(b) by 1093 days.

(21) Appl. No.: 11/778,629

(22) Filed: Jul. 16, 2007

(65) Prior Publication Data

US 2008/0040716 A1 Feb. 14, 2008

Related U.S. Application Data

(60) Provisional application No. 60/830,771, filed on Jul. 14, 2006, provisional application No. 60/835,258, filed on Aug. 2, 2006, provisional application No. 60/836,255, filed on Aug. 7, 2006, provisional application No. 60/883,746, filed on Jan. 5, 2007, provisional application No. 60/896,079, filed on Mar. 21, 2007, provisional application No. 60/910,771, filed on Apr. 9, 2007.

(51) Int. Cl.
*G06F 9/455* (2006.01)
*G06F 9/00* (2006.01)
*G06F 9/24* (2006.01)
*G06F 9/445* (2006.01)

(52) U.S. Cl.
USPC ............... 718/1; 717/174; 717/177; 717/178; 713/1; 713/2

(58) Field of Classification Search
USPC .............. 718/1–105, 108; 709/201–203, 709/223–226
See application file for complete search history.

(56) References Cited

U.S. PATENT DOCUMENTS

| 6,366,776 | B1 * | 4/2002 | Wright et al. ............... 455/427 |
| 6,615,303 | B1 * | 9/2003 | Endo et al. .................. 710/260 |
| 7,142,479 | B2 * | 11/2006 | Floman et al. ............ 365/233.1 |
| 7,340,538 | B2 * | 3/2008 | Alappat et al. ................. 710/5 |

(Continued)

FOREIGN PATENT DOCUMENTS

| JP | 2006072591 A | 3/2006 |
| WO | 2006/036277 A2 | 4/2006 |
| WO | 2007/149671 A2 | 12/2007 |

*Primary Examiner* — Abdullah Al Kawsar
(74) *Attorney, Agent, or Firm* — Park, Vaughan, Fleming & Dowler LLP

(57) ABSTRACT

A universal appliance combines the benefits of a fixed-function CE device with the generality of a PC. The universal appliance includes a host environment for supporting fixed functions and virtual machines that can provide general computing capabilities (e.g., a Windows® OS). The user can select fixed functions and virtual machines for operation on the universal appliance. In some implementations, software environments, including the fixed functions and virtual machines, can be delivered by a universal appliance service provider over a network or other communication medium. The software environments for fixed functions and virtual machines can also be delivered by a removable or portable medium (e.g., a USB flash drive, compact disk, media player, mobile phone). Twenty-four hour server functions can be provided with the universal appliance to allow for automatic data backup, remote access to personal data and an Internet telephone that can accept calls 24 hours a day.

20 Claims, 11 Drawing Sheets

(56) References Cited

U.S. PATENT DOCUMENTS

| | | | |
|---|---|---|---|
| 7,668,937 B2* | 2/2010 | Neil et al. | 709/219 |
| 7,735,081 B2* | 6/2010 | Robinson et al. | 718/1 |
| 7,895,594 B2* | 2/2011 | Kirilline et al. | 718/1 |
| 7,926,054 B2* | 4/2011 | Sonderegger et al. | 718/1 |
| 7,987,432 B1* | 7/2011 | Grechishkin et al. | 715/778 |
| 8,091,084 B1* | 1/2012 | Dobrovolskiy et al. | 717/174 |
| 8,443,358 B1* | 5/2013 | Larkin et al. | 717/174 |
| 2004/0229598 A1* | 11/2004 | Tajima et al. | 455/414.1 |
| 2005/0125513 A1* | 6/2005 | Lam et al. | 709/220 |
| 2005/0193188 A1* | 9/2005 | Huang | 713/1 |
| 2006/0026268 A1* | 2/2006 | Sanda | 709/221 |
| 2006/0064688 A1* | 3/2006 | Tseng | 718/1 |
| 2006/0070085 A1* | 3/2006 | Bao et al. | 719/319 |
| 2006/0101189 A1 | 5/2006 | Chandrasekaran et al. | |
| 2006/0277542 A1 | 12/2006 | Wipfel | |
| 2007/0006205 A1 | 1/2007 | Kennedy et al. | |
| 2007/0058559 A1* | 3/2007 | Xu | 370/252 |
| 2007/0089111 A1 | 4/2007 | Robinson et al. | |
| 2007/0162521 A1 | 7/2007 | Raghunath | |
| 2007/0198713 A1 | 8/2007 | Tsao et al. | |
| 2007/0220246 A1* | 9/2007 | Powell et al. | 713/2 |
| 2008/0028400 A1* | 1/2008 | Taillefer et al. | 718/1 |
| 2008/0104588 A1 | 5/2008 | Barber et al. | |
| 2008/0126785 A1* | 5/2008 | Chong et al. | 713/2 |
| 2008/0127181 A1* | 5/2008 | Allard et al. | 718/1 |

* cited by examiner

FIXED-FUNCTION CONSUMER-ELECTRONICS DEVICE PROVIDING GENERAL-COMPUTING FUNCTIONS WITH VIRTUAL MACHINES

RELATED APPLICATIONS

This application claims the benefit of priority of the following U.S. Provisional Patent Applications:

U.S. Patent Application No. 60/830,771, for "Universal Appliance," filed Jul. 14, 2006;

U.S. Patent Application No. 60/835,258, for "Sharing Live Appliances," filed Aug. 2, 2006;

U.S. Patent Application No. 60/836,255, for "Hardware-based Activation of Software Installed on a Virtual Machine or Mobile Device," filed Aug. 7, 2006;

U.S. Patent Application No. 60/883,746, for "Symbiotic Smart Peripherals," filed Jan. 5, 2007;

U.S. Patent Application No. 60/896,079, for "Multi-platform, Compatible, Portable Virtual Machine Player," filed Mar. 21, 2007; and U.S. Patent Application No. 60/910,771, for "Trace-assisted Prefetching of Virtual Machines in a Distributed System," filed Apr. 9, 2007.

The contents of each of these patent applications is incorporated by reference herein in its entirety.

TECHNICAL FIELD

The subject matter of this application is generally related to computers and consumer electronic (CE) devices.

BACKGROUND

A typical home or work environment includes a personal computer (PC) for providing general computing capability (e.g., word processing, surfing the Internet) and a variety of CE devices (e.g., a clock radio, digital picture frame, telephone, calendar, jukebox, game console) for providing various fixed functions. The PC can also include one or more communications-based applications, such as email, instant messaging and a browser.

Many consumers are reluctant to replace their CE devices with a PC. Many fixed function CE devices are highly stable, whereas some PC operating systems are notoriously unstable. If the PC "crashes" the consumer can lose access to applications, including communications-based applications. If the user relies on their PC for all their communication needs, then the user could lose all means of communication when their PC crashes.

CE devices are easy to use. Consumers are frustrated by the complexities of PCs. The typical CE device provides a simple and clean user interface that is tightly integrated with the functions provided. Often the user need only interact with a few controls to operate the device. There is no cumbersome operating system that must boot up before the user can access the functionality of the CE device.

Some CE devices, such as telephones, are "always on." Thus, a user can receive telephone calls 24 hours a day. By contrast, a PC-based telephone (e.g., Internet phone) can only operate if the PC is turned on. Similarly, the PC must be turned on to receive email.

SUMMARY

A universal appliance combines the benefits of a fixed-function CE device with the generality of a PC. The universal appliance includes a host environment which can support one or more fixed functions and virtual machines that can provide general computing capabilities (e.g., a Windows® OS). The operation of the virtual machine is isolated from the host environment supporting the fixed functions, so if a virtual machine becomes unstable or is otherwise compromised (e.g., infected with a virus), the underlying fixed functions are not affected.

The user can select fixed functions and virtual machines for operation on the universal appliance. In some implementations, software environments, including the fixed functions and virtual machines, can be delivered by a universal appliance service provider over a network or other communication medium. The software environments for fixed functions and virtual machines can also be delivered by a removable or portable medium (e.g., a USB flash drive, compact disk, media player, mobile phone). After the software is delivered it can be automatically installed, thus avoiding the need for manual installation by the user. A universal interface can be provided with the universal appliance that adjusts automatically to display one or more user interface elements for the selected fixed functions and/or virtual machines in an aesthetic manner. Twenty-four hour server functions can be provided with the universal appliance to allow for automatic data backup, remote access to personal data and an Internet telephone that can accept calls 24 hours a day.

DETAILED DESCRIPTION

Universal Appliance Overview

Figure 1:
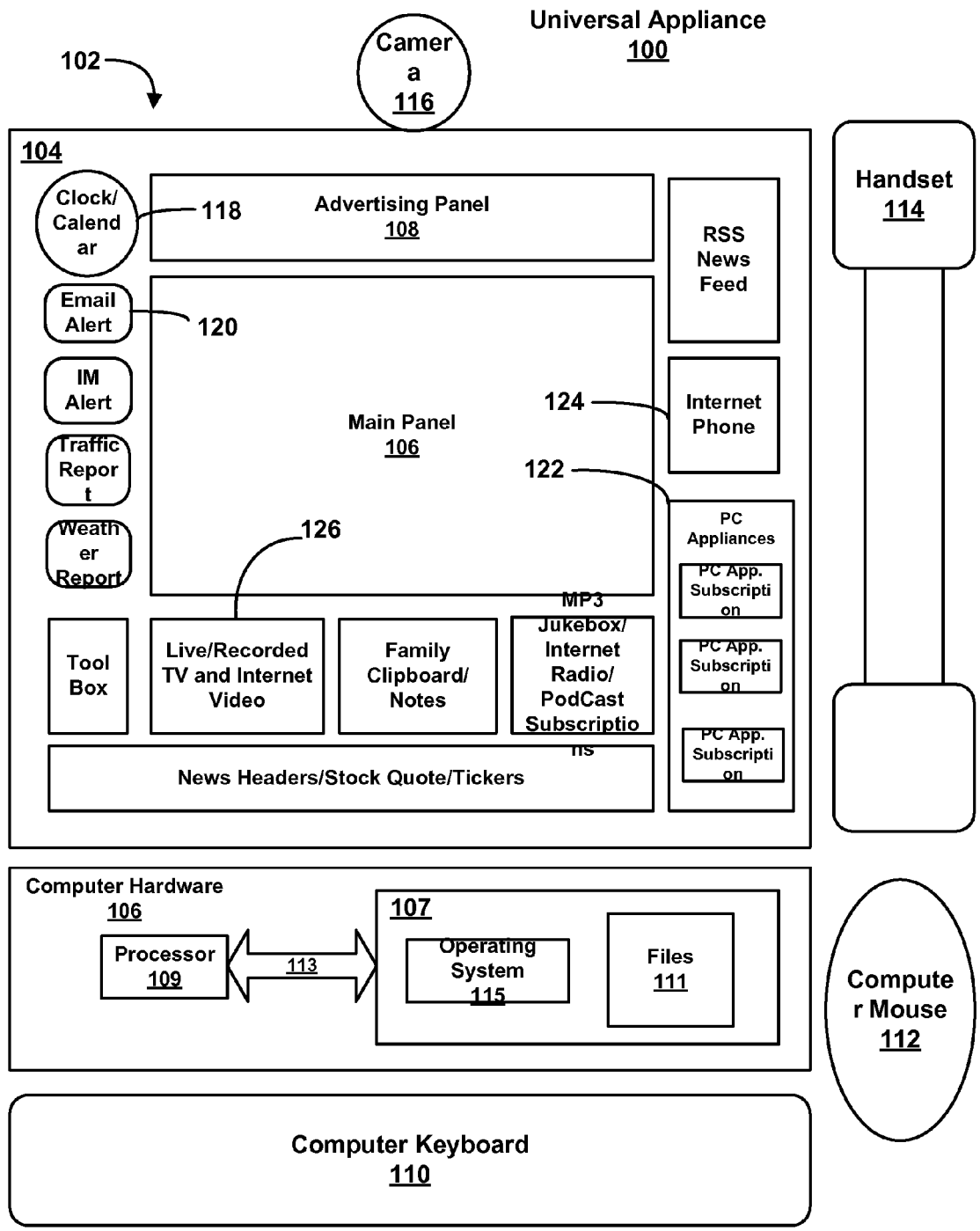
FIG. 1 is a block diagram of an exemplary universal appliance.

FIG. 1 is a block diagram of an exemplary universal appliance 100. In some implementations, the universal appliance 100 includes display screen 102, computer hardware 106, keyboard 110, mouse 112, telephone handset 114 and camera 116.

The display screen 102 is for visual and/or tactile display of images, video, text and other content. Some examples of a display screen 102 are analog displays, digital electronic displays, liquid crystal (LCD) displays, flat panel displays, nanotube or nanocrystal displays, three dimensional (3D) displays, surfaces for receiving projections, holograms, segment displays, etc. In some implementations, the display screen 102 is touch-sensitive or multi-touch sensitive, and is responsive to a stylus and/or one or more of a user's fingers.

Some examples of a keyboard 110 are tethered keyboards, split keyboards, wireless keyboards, virtual keyboards, soft or flexible keyboards, etc. The keyboard 110 can be a separate hardware device or integrated into the display device 102, or any other hardware device (e.g., a remote control device, a mobile phone, personal digital assistant (PDA)).

The mouse 112 can be any type of mouse that is commercially available. Some mouse examples are a wheel mouse, optical mouse, wireless mouse, etc. Other pointing devices can be used in place of, or in addition to the mouse, such as a trackball, joystick, light pen, stylus, fingers, etc.

The handset 114 can be a telephone handset, headset or any other known telephony device. Some examples of telephony devices are wireless handsets or headsets, cordless phones, cell phones, smart phones, soft phones, USB phone, etc.

The camera 116 can be a video camera (e.g., a Web cam) or still image camera and can be wireless or tethered to the computer hardware 106. The camera 116 can be used with an Internet phone application, a described in reference to FIG. 4e.

The computer hardware 106 can include any hardware commonly used in a PC or CE device. For example, the computer hardware 106 can include one or more processors 109. Some examples of processors are Intel® or AMD® processors, PowerPC® processors, a MIPS® reduced instruction set computers ("RISC"), SPARC® processors, ACORN® RISC Machine ("ARM") architecture processors, etc. The processors 109 can be discrete chips, chip sets and/or embedded processors.

The processor 109 can communicate with one or more computer-readable mediums 107 over one or more communication channels 113. Some examples of computer-readable mediums 107 are volatile and non-volatile memory (e.g., RAM, ROM, EPROM, EEPROM, DRAM, Flash), hard disks, magnetic disks, floppy disks, optical disks, flash drives, extended storage devices, network devices, micro-drives, cartridges, cassettes, a compact disc (CD), a digital video disc (DVD)). The term "computer-readable medium" can also refer to transmission media such as coaxial cables, copper wire and optical fiber. Transmission media can also take the form of acoustic, light or radio frequency waves.

The communication channel 113 can be any system that transfers data, control signals and/or power between components inside the computer hardware 106 or to a network device (e.g., Ethernet, FireWire®, USB), including optical or electrical buses (e.g., PCI Express, PCI, Hypertransport) with multiple connections, or any other physical arrangement that provides the same logical functionality as a parallel electrical bus. Buses can include both parallel and bit-serial connections, and can be wired in either a multi-drop or daisy chain topology, or connected by switched hubs, as in the case of USB.

The computer readable mediums 107 can include a host operating system 115. The host operating system 115 can be any proprietary or known operating system, such as Microsoft® Windows®, UNIX®, Linux®, Palm®, Mac OS®, etc. The operating system 115 can be multi-user, multiprocessing, multitasking, multithreading, real time and the like. The operating system 115 performs basic tasks, including but not limited to: recognizing input from the keyboard 110, mouse 112, handset 114 and camera 116 and providing output to the display screen 102; keeping track and managing files 111 and directories on computer-readable mediums 107; controlling peripheral devices; and managing traffic on the one or more communication channels 113. The operating system can also include components for establishing and maintaining network connections (e.g., software for implementing communication protocols, such as TCP/IP, HTTP, Ethernet, etc.).

The files 111 can include data, computer instructions, content (e.g., photos, video) and one or more applications (e.g., a browser, a media player, instant messaging, email, word processing, telephony software).

The universal appliance 100 can run Linux® OS as a host environment for supporting fixed functions. Although Linux® OS can be cheaper to operate and has useful functions, many users may still prefer to run Windows® or other proprietary operating systems (e.g., Mac® OS) because they are familiar with these operating systems. In some implementations, these users can run Windows® in a virtual machine on top of the Linux® OS or any other desired operating system. In other implementations, a removable media (e.g., a USB flash drive, CD, media player) can be used to install a complete universal appliance environment (including fixed functions, user interfaces and virtual machines) into a native operating system running on the universal device (e.g., Windows®). In such an implementation, the user may or may not continue to have access to the native operating system. For example, the user may be exposed to custom user interfaces and not a generic Windows® desktop user interface.

In some implementations, the user can be provided with a customizable user interface for one or more fixed functions, which allows the user to interact with the fixed function, but does not allow the user to interact or change the host environment supporting the fixed function. The host environment for fixed functions is transparent to the user and cannot be changed by the user. If the user desires to interact with a general computing environment (e.g., a PC) they can do so by running the general computing environment in a virtual machine. The user interface can be customized using configuration settings stored on the universal appliance 100, configuration settings stored on a network, configuration settings saved from a previous session on the universal appliance 100. In some implementations, the configuration settings can be stored on a removable medium (e.g., a USB flash drive, CD, media player, mobile phone). Alternatively, the removable medium may include information for obtaining configurations settings from a network device. In other embodiments, the configuration settings can be obtained from a wireless device (e.g., a Bluetooth® device).

Another advantage of the universal appliance 100 is that the host environment, fixed functions and virtual machines can be delivered, installed and managed by a third party over a network or other communication channel (e.g., Internet, cable network, wireless network). Thus, the user need only select desired functionality for a particular universal appliance 100, and a third party handles the technical details associated with the delivery, installation and management of software for the universal appliances 100, as described with reference to FIG. 5.

In some implementations, the universal appliance 100 includes a user interface 104. The user interface 104 can include a main panel 106, an advertising panel 108 and a variety of other user interface elements for receiving input from the user or for presenting information to the user. Some examples include an icon 118 for invoking a clock function, an icon 120 for invoking an email function, a panel 122 for displaying PC appliance subscriptions, a panel 124 for displaying Internet phone information (e.g., Skype® voice services) and a panel 126 for displaying a live and recorded television broadcasts or Internet video.

The main panel 106 can be used for displaying various content (e.g., videos, photos, emails, documents, web pages and other user interfaces). In some implementations, when the universal appliance 100 is idle, the main panel 106 can display predetermined or canned content, such as family pictures. For example, the main panel 106 could display photos from an online photo service (e.g., Flickr®) as a slide show, as described in reference to FIG. 4f. The advertising panel 108 can be used to display various forms of advertising (e.g., text or image ads).

In the example shown, there are multiple user interface elements displayed in the user interface 104. User interface elements can be any known user interface element, such as buttons, panels, menus, dialog or search boxes, panes, tool bars, scroll bars, knobs, sliders, text boxes, picture frames, icons, hot spots, etc. The user interface elements can be used to interact with a variety of fixed and non-fixed functions on the universal appliance 100. Some examples of fixed functions are a clock/calendar, email, instant messaging (IM), weather reports, "live" and recorded television broadcasts, Internet video, family clipboard/notes, media player, Internet radio, PodCast subscriptions, news headers, stock quotes, ticker tape, RSS news feeds, Skype® voice service, Internet phone, etc. Example of a non-fixed or general function would be a PC.

User interface elements can be any size or shape and can be manually or automatically located anywhere on the user interface 104. In some implementations, the universal appliance 100 can automatically place the user interface elements in the user interface 104 to provide an aesthetically pleasing appearance. The user can specify a variety of display characteristics, such as color schemes, themes, font style and size, etc. In some implementations, the user can click on a user interface element to resize or relocate (e.g., drag n drop) the user interface element anywhere on the user interface 104. The user interface elements can have a "repulsion" property, so that a user interface element is moved other user interface elements move out of the way to avoid elements from overlapping in the user interface 104.

The user interface 104 and the various user interface elements described above are examples of the many different configurations for the universal appliance 100. In some implementations, the user can select a desired number of fixed functions for a given universal appliance 100 from a list of fixed functions presented in a preference pane, menu or other user interface element. Such a list or menu could be presented on a web page served over a network by a service provider. The service provider can download the software for the selected functions to the universal appliance 100 using, for example, push technology. In other implementations, the universal appliance 100 can include preloaded functions that can be updated by a service provider through a network connection.

Some functions can run on the universal appliance 100 as a background process. For example, a peer-to-peer storage sharing protocol could be run in the background by a host server (e.g., a Linux® server). Background processes can include 24-hour server functions for performing various functions, such as data backup and remote data access. For example, a server function can swap files and pre-fetch shared data as a background process 24 hours a day in a manner that is transparent to the user and does not interfere with the operation of other functions.

Universal Appliance Architecture

Figure 2:
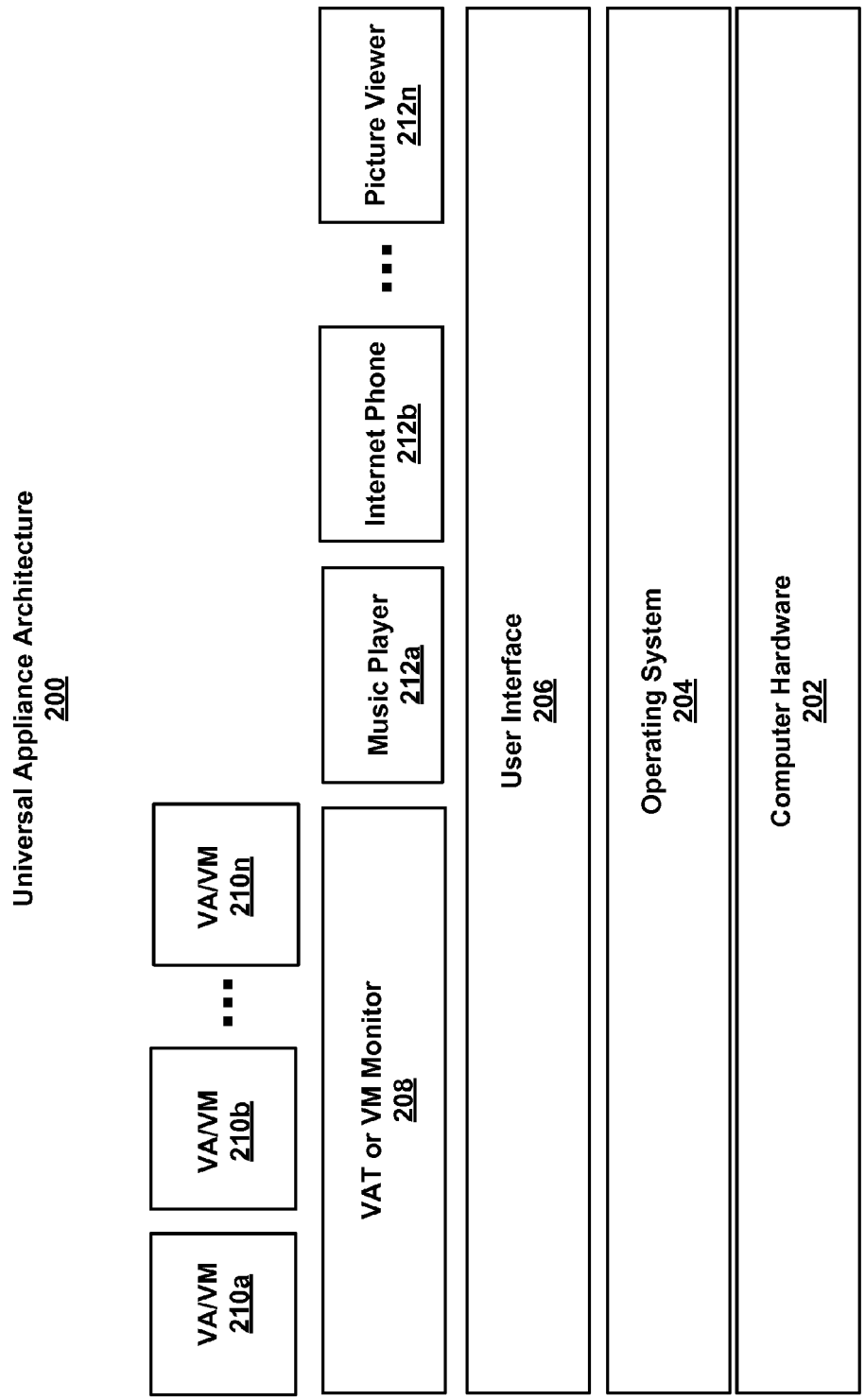
FIG. 2. is a block diagram of an exemplary architecture for a universal appliance with virtualization capability.

FIG. 2. illustrates an exemplary architecture 200 for the universal appliance 100 with virtualization capability. In some implementations, the architecture 200 includes computer hardware 202, an operating system 204, a user interface 206, a virtual appliance transceiver 208 (VAT) and fixed functions 212a, ..., 212n. The virtual appliance transceiver 208 provides an environment for running virtual appliances 210a, ..., 210n.

The computer hardware 202, operating system 204 and user interface 206 were previously described in reference to FIG. 1. Some examples of fixed functions 212 are a music player 212a, an Internet phone 212b and a picture viewer 212n. Other fixed functions are possible, such as the fixed functions described in reference to FIG. 1.

In some implementations, the virtual appliance transceiver 208 includes a virtual machine monitor plus other technologies and optimizations to enable the publication and subscription of virtual appliances 210a, ..., 210n. One significant advantage provided by the virtual appliance transceiver 208 is that the entire image of a virtual appliance 210 does not have to be downloaded to the universal appliance 100 before the virtual appliance 210 can be run on the universal appliance 100.

In some implementations, the virtual appliance transceiver 208 provides an environment for virtual appliances 210 that is isolated from the host operating system 204 and the fixed functions 212 supported by the host operating system 204. For example, Windows® can be run as a virtual appliance or virtual machine on top of a Linux® OS using the virtual appliance transceiver 208. Any operations performed in Windows® or user data that is generated will not affect the Linux® OS or any fixed functions 212 supported by the Linux® OS. Thus, fixed functions 212 supported by the Linux® OS will not be affected by an unstable virtual appliance 210, or a virtual appliance 210 that has been compromised due to a virus, spyware or other malicious software.

Virtual appliances and virtual appliance transceivers are described in U.S. patent application Ser. No. 11/007,911 (now issued U.S. Pat. No. 7,373,451), for "Cache-Based System Management Architecture With Virtual Appliances, Network Repositories, and Virtual Appliance Transceivers," filed Dec. 8, 2004, which application is incorporated by reference herein in its entirety.

Instead of, or in addition to the virtual appliances 210 and virtual appliance transceiver 208 shown in FIG. 2, other known virtualization techniques can be used with the universal appliance 100, such as the virtual machines and virtual machine monitors developed by VMware Inc. (Palo Alto, Calif.). Other commercially available virtual machines include Microsoft® Virtual PC, Xenosource Xen, qemu, Parallels and Virtuozzo.

In some implementations, the universal appliance 100 can download and install a virtual appliance 210 that provides general PC functionality (hereinafter referred to as a "PC appliance"). The virtual appliance transceiver 208 isolates the PC appliance from the host operating system 204 and the fixed applications 212 supported by the host operating system 204. The PC appliance can be downloaded as part of a publication/subscription system, as described in U.S. Provisional Patent Application No. 60/835,258, for "Sharing Live Appliances," filed Aug. 2, 2006, which application is incorporated by reference herein its entirety.

Occasionally changes to the host operating system 204 and/or fixed applications 112 may be needed. Those changes can be downloaded from a network to the universal appliance 100 as a background process that can be transparent to the user. Once the download is complete, the host operating system 204 can initiate a reboot when there is idle time (e.g., no interactivity with the user) or upon approval from the user.

Simplified Universal Appliance Example (Digital Picture Frame)

Figure 3:
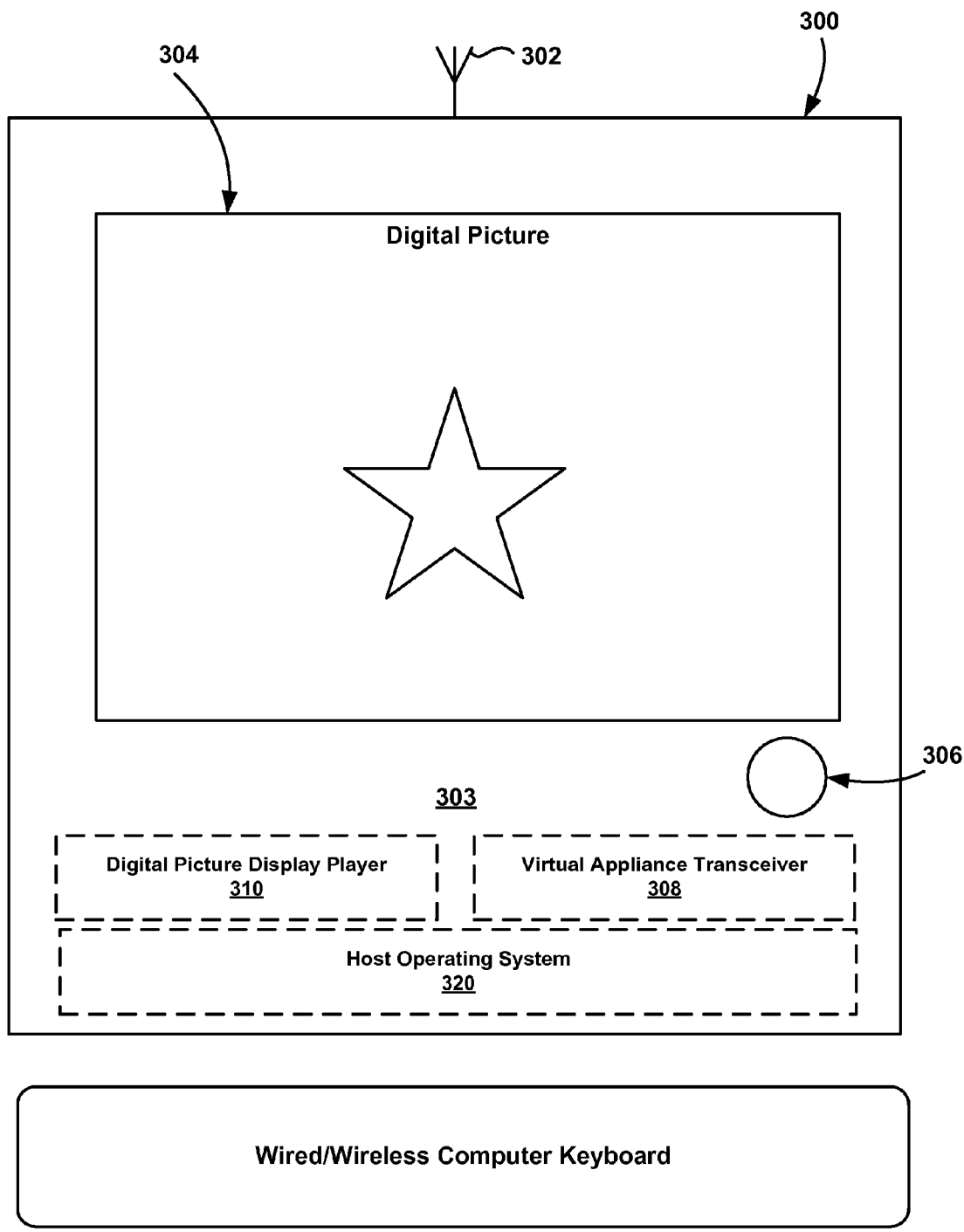
FIG. 3 is a block diagram of a exemplary simplified universal appliance.

FIG. 3 is a block diagram of a exemplary simplified universal appliance. In the example shown, the universal appliance is a digital picture frame 300. The digital picture frame 300 includes an LCD display 304 and a button 306 for launching a virtual appliance (e.g., a PC appliance). An antenna 302 can also be included for Internet access or wireless connectivity with one or more control devices (e.g., a wireless keyboard and/or mouse).

In some implementations, the software architecture 303 of the digital picture frame 300 can include a host operating system 320, a digital picture display player 310 and a virtual appliance transceiver 308 for providing an environment for virtual appliances, such as a PC appliance (not shown). As previously described in reference to FIG. 2, the virtual appliance transceiver 308 can provide an environment for a PC appliance that isolates the PC appliance from the host operating system 320 and any fixed functions supported by the host operating system 320, which in this example includes the digital picture display player 310.

In operation, the digital picture display player 310 can display photos on the LCD 304 when the PC appliance is not invoked. When the user presses the button 306 the PC appliance is launched, allowing the user to operate the digital picture frame 300 as full functioning PC complete with Internet connectivity.

Thus, the digital picture frame 300 is an example of how the generality of a PC can be combined with a fixed function, which in this example is the digital picture display player 310. Because of the isolation afforded by the software architecture 303, if the PC appliance fails or is otherwise compromised (e.g., infected by a virus) the digital picture display player 310 will not be affected.

The simple design of the digital picture frame 300 can be extrapolated to a variety of popular CE devices, including clock radios, telephones, furniture, kitchen and bathroom appliances, etc. Because of the simple design, CE devices can be designed with aesthetically pleasing shapes and small form factors.

Universal Appliance Workflows

FIGS. 4a-4f are flow diagrams of exemplary workflows associated with a universal appliance 100. The workflows described below do not have to occur in sequential order. At least some of the steps of the workflows can occur in parallel or in a different order. Some of the steps may be optional depending on the workflow.

A main workflow 400 begins when the universal appliance powers up (402). After power up, the universal appliance boots a host operating system (404), which starts a user interface (406). The user interface can be, for example, the user interface 104 described in reference to FIG. 1.

In some implementations, the universal appliance gathers information from one or more information resources (408). For example, a browser running on the universal appliance may be directed to a website for subscribing to a PC appliance service. Other resources could include websites that provide weather reports, traffic reports, news, RSS feeds or any other content that the user may have subscribed to or that is related to a fixed function hosted on the universal appliance. When the information is collected and/or a communication link is established (e.g., an RSS feed), the information can be presented in panels or otherwise associated with user interface elements on the user interface of the universal appliance (410). The number and types of resources that are included in the information gathering step can be dependent on the fixed functions selected by the user for use on the universal appliance.

In some implementations, a panel on the user interface (e.g., main panel 106) can immediately start displaying predetermined or "canned" content, such as family photos, video clips, animation, etc. (412). If the content is photos, for example, then the universal appliance can present a "slide show," where a different photo is displayed in the main panel after a predetermined time interval has expired (414), which can be set by the user. If no user actions are detected (416), then the photos can be continuously looped in a "slide show." This feature would be particularly well-suited for the digital picture frame 300, described in reference to FIG. 3.

If user actions are detected (416), then a different workflow will proceed based on the fixed function that is requested. The workflows 417, 437, 457, 477 and 500, described below, are examples of workflows for clock/calendar functions, email functions, PC appliance subscriptions, Internet phone functions and live/recorded television broadcast and Internet video functions. Workflows for other fixed and general functions are possible and may require more or fewer steps, or different types of steps.

Clock/Calendar Workflow Example

Figure 4A:
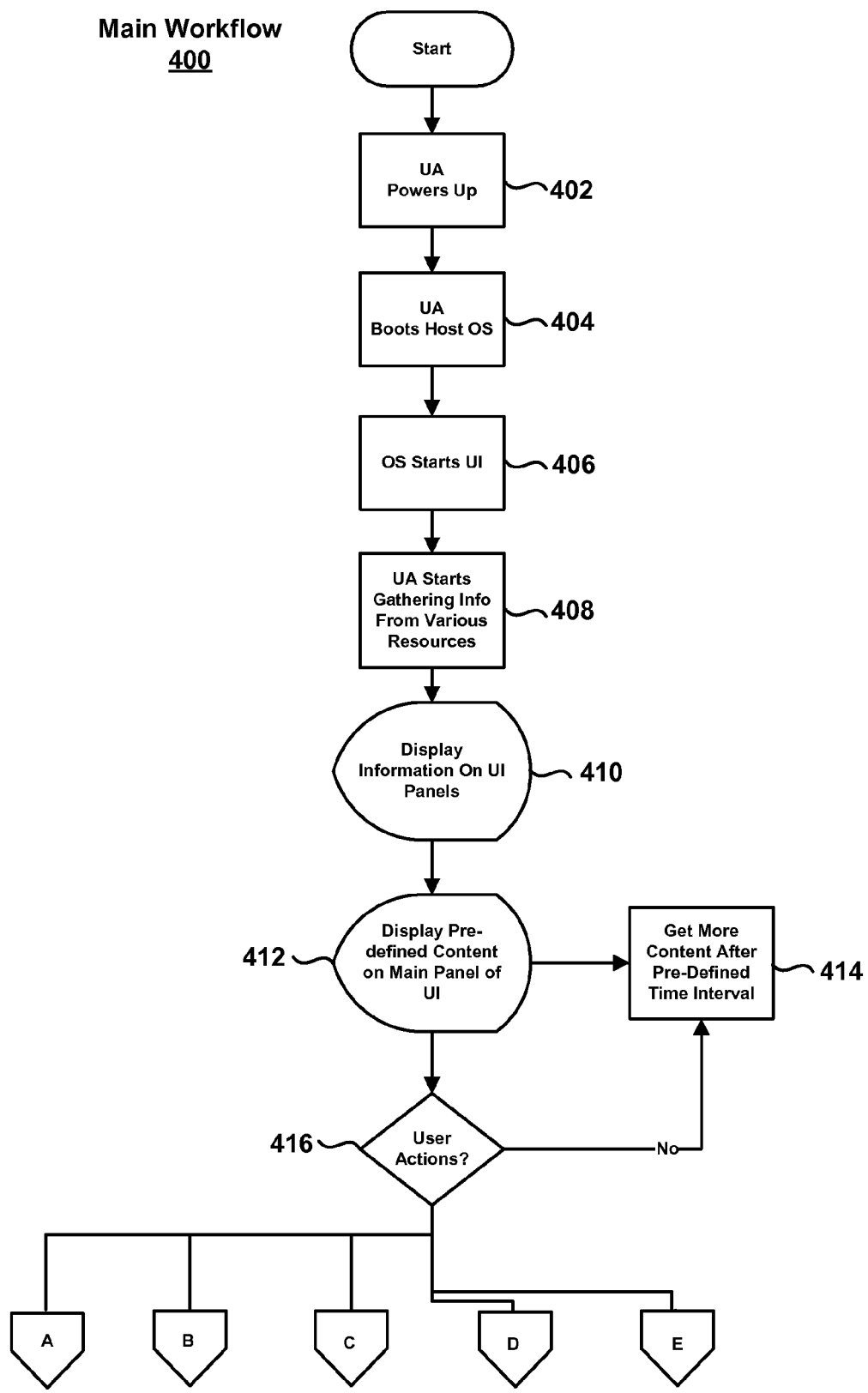
FIGS. 4a-4f are flow diagrams of exemplary workflows associated with a universal appliance.
Figure 4B:
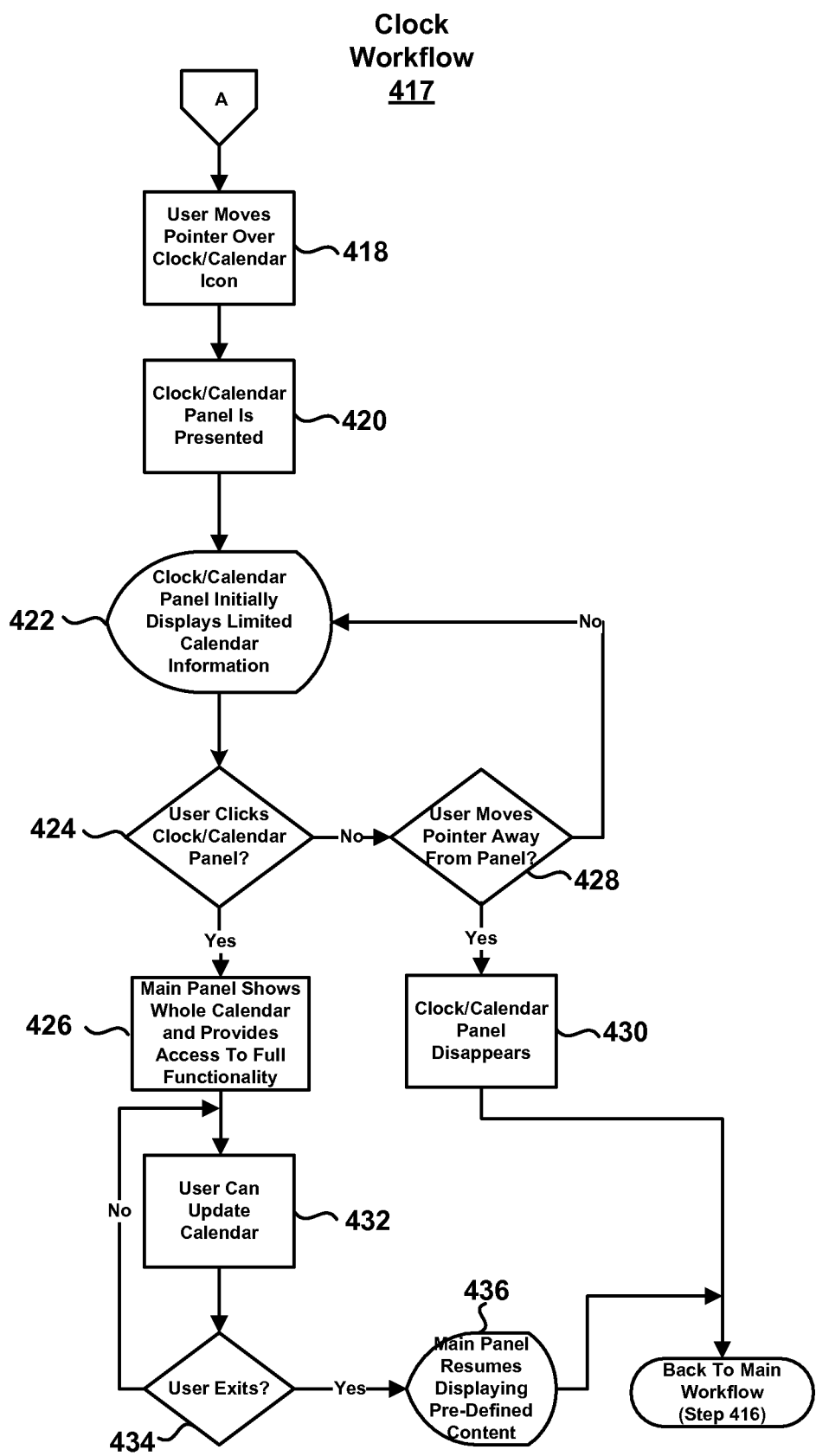

Referring to FIG. 4b, an example clock/calendar workflow 417 is shown. In some implementations, the user can interact with a clock/calendar function by moving a pointer (e.g., a mouse pointer) over a clock/calendar icon (418). In response to the mouse over, a clock/calendar panel is presented (420). The clock/calendar panel can initially display limited information (422), such as calendar entries for the next x hours in a fixed or user defined format.

In some implementations, if the user clicks the clock/calendar panel (424), the main panel of the user interface (e.g., main panel 106) of the universal appliance displays the entire calendar and provides the user with access to the full functionality of the calendar (426). If the user does not click the clock/calendar panel, and does not move the pointer away from the clock/calendar icon (428), then the clock/calendar workflow 417 returns to step 422. If the user does not click the clock/calendar panel, and does move the pointer away from the clock/calendar panel (428), then the clock/calendar panel disappears (430) and the clock/calendar workflow 417 returns to step 416 of the main workflow 400 and waits for the next user action.

After the user clicks the clock/calendar panel causing a fully functional calendar to be displayed in the main panel (426), the user can update the calendar as desired (432). When the user has finished updating the calendar, the user can exit the clock/calendar workflow 417 by clicking an exit button or by pressing an escape key or other key combination. If the user exits (434) the clock/calendar workflow 417, the main panel can start showing predetermined content again (436) and the clock/calendar workflow 417 returns to step 416 of the main workflow 400 to wait for the next user action. Otherwise, the clock/calendar workflow 417 returns to step 432 and waits for the user to exit.

Email Workflow Example

Figure 4C:
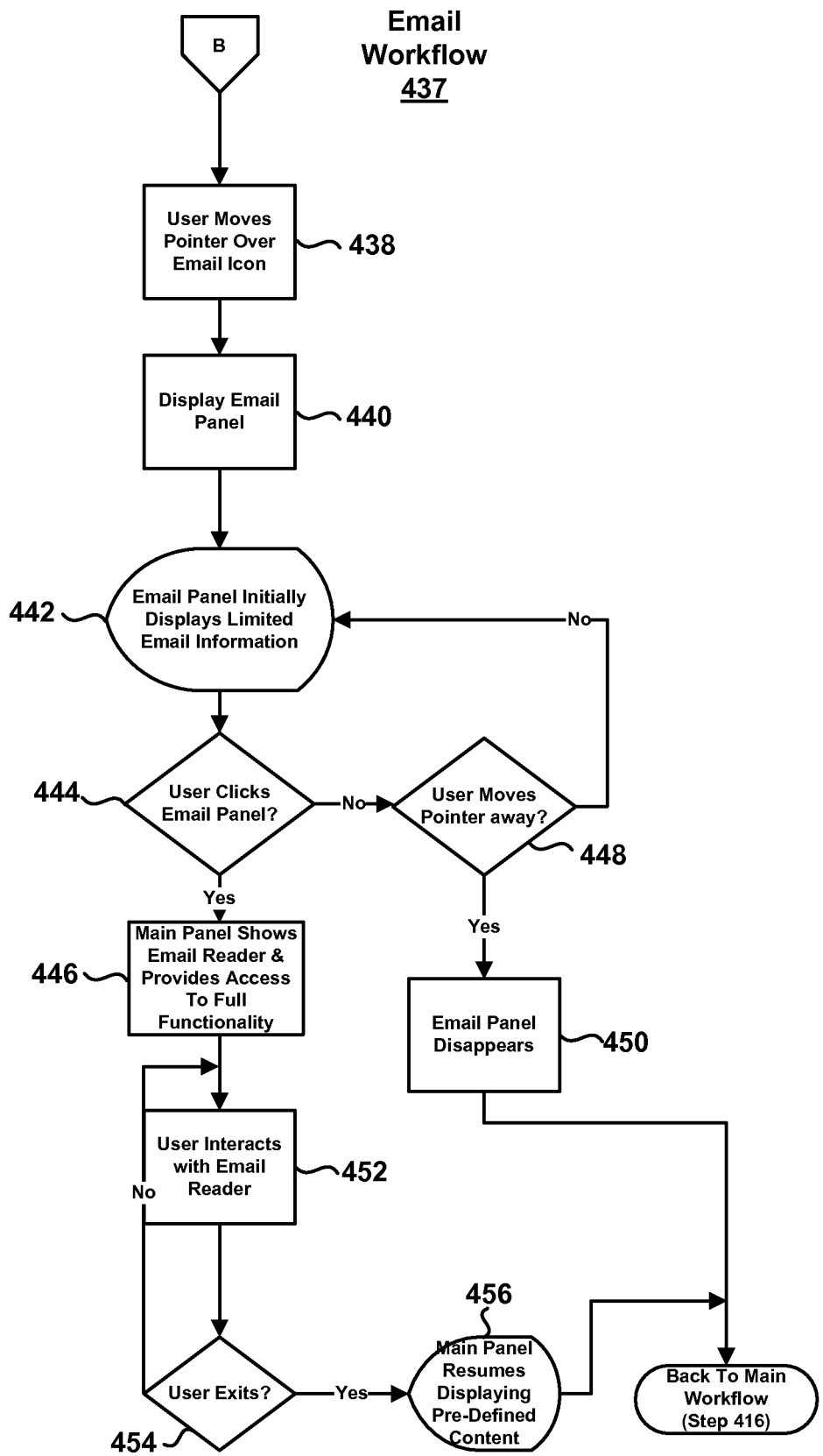

Referring to FIG. 4c, an example of an email workflow 437 is shown. In some implementations, the user can interact with an email function by moving a mouse pointer over an email icon (438). In response to the mouse over, an email panel is displayed (440). The email panel can initially display limited information, such as a summary of the first x messages received for the day in a fixed or user defined format (442).

In some implementations, if the user clicks the email panel (444), the main panel (e.g., main panel 106) of the universal appliance displays an email reader and provides the user with access to full email functionality (446). If the user does not click the email panel (444) and does not move the pointer away from the email panel (448), then the email workflow 437 returns to step 442. If the user does not click the email panel (444) and moves the pointer away from the email panel (448), then the email panel disappears (450) and the email workflow 437 returns to step 416 of the main workflow 400 and waits for the next user action.

After the user clicks the email panel, causing the email reader to be displayed in the main panel (446), the user can send and receive emails or perform other email-related functions (452). When the user has finished, the user can exit the email workflow 437. If the user exits (454) the email workflow 437, the main panel can resume displaying predetermined content (456) and the email workflow 437 returns to step 416 of the main workflow 400 to wait for the next user action. Otherwise, the email workflow 437 returns to step 452 and waits for the user to exit.

PC Appliance Workflow Example

Figure 4D:
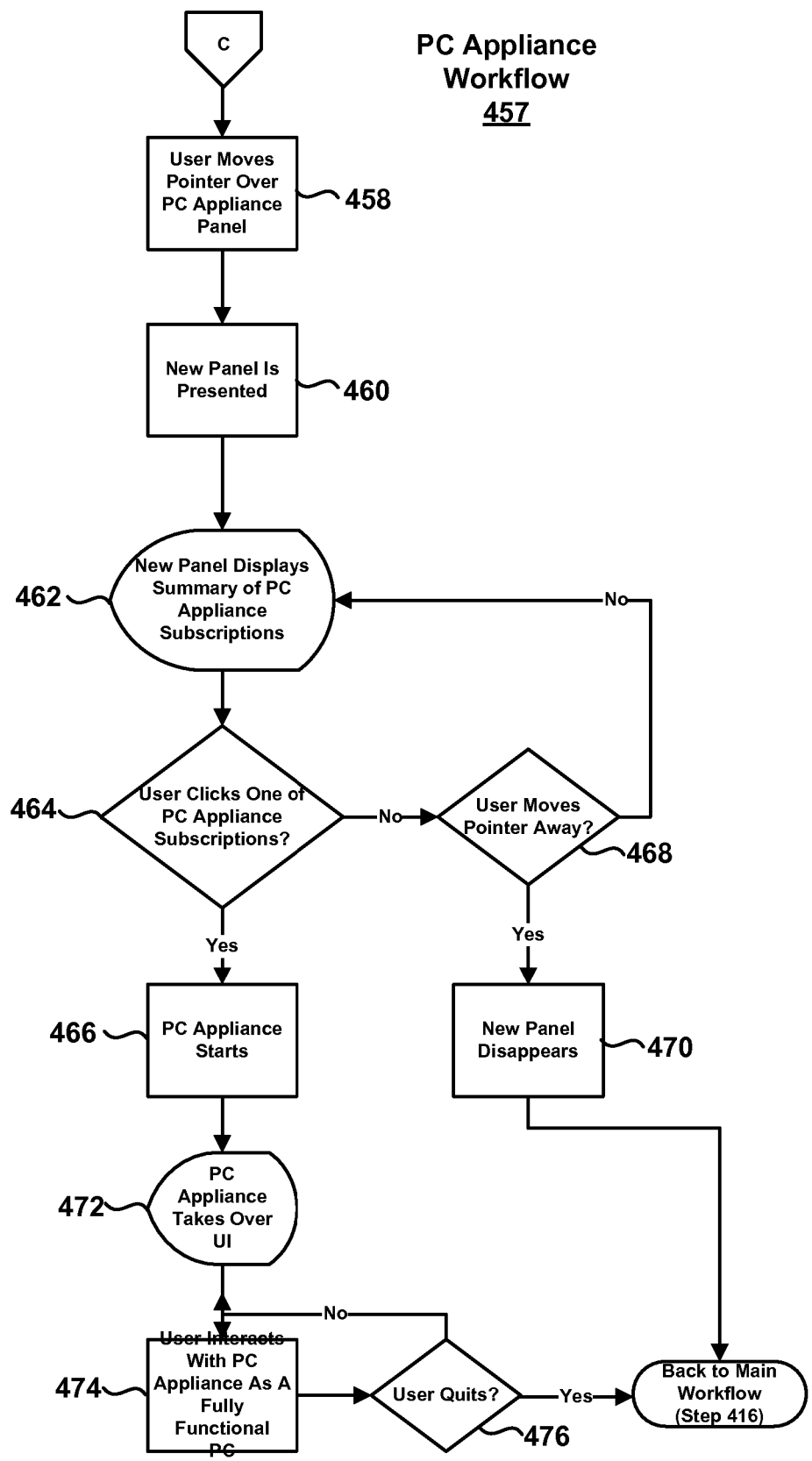

Referring to FIG. 4d, an example of a PC appliance workflow 457 is shown. In some implementations, the user can interact with a PC appliance subscription service by moving a mouse pointer over a PC appliance panel (458). In response to the mouse over action, a new panel is presented (460). The new panel can initially display a summary of PC appliance subscriptions in a fixed or user defined format (462).

In some implementations, if the user clicks one of the PC appliance subscriptions listed in the new (464), the associated PC appliance starts (466). If the user does not click a subscription (464) and does not move the pointer away from the new panel (468), then the PC appliance workflow 457 returns to step 462. If the user does not click a subscription (464) and moves the pointer away from the new panel (468), then the new panel disappears (470) and the PC appliance workflow 457 returns to step 416 of the main workflow 400 and waits for the next user action.

After the user clicks a subscription causing the associated PC appliance to start (466), the PC appliance can take over the entire user interface of the universal appliance (472) and the user can interact with a fully functional PC (474). When the user has finished, the user can exit the PC appliance by clicking a button or by other means (e.g., a key combination, hot key). If the user quits (476) the PC appliance, the PC appliance workflow 457 returns to step 416 of the main workflow 400 and waits for the next user action. Otherwise, the PC appliance workflow 457 returns to step 474 and waits for the user to exit.

Internet Phone Workflow Example

Figure 4E:
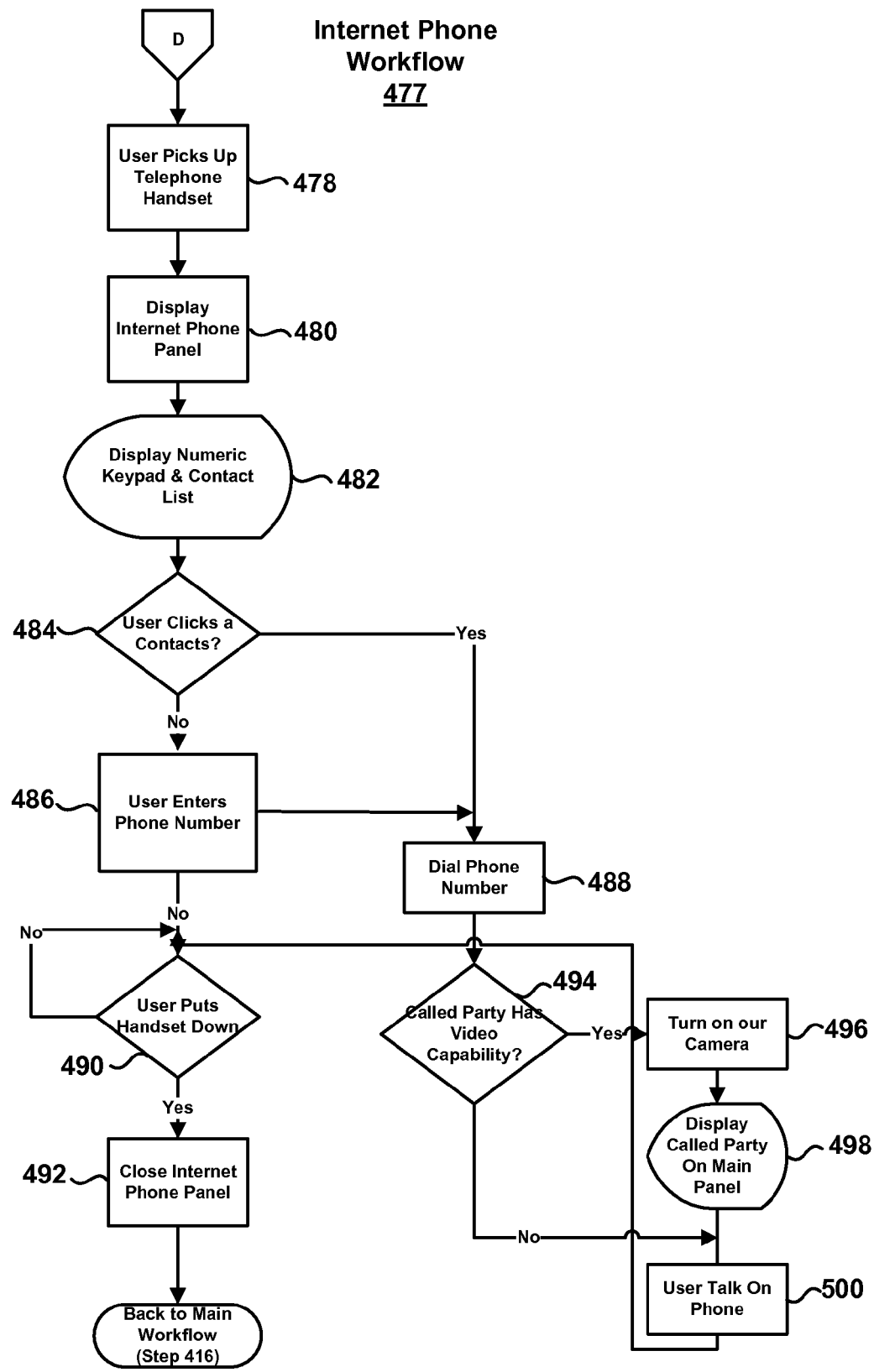

Referring to FIG. 4e, an example of an Internet phone workflow 477 is shown. In some implementations, the Internet phone workflow 477 begins when the user picks up (or turns on) a telephone handset (478). When the handset is picked up by the user, an Internet phone panel (e.g., panel 126) is presented on the user interface of the universal appliance (480). The Internet panel can be configured to initially display a numeric keypad, contact list and/or any other telephone-related information (482).

In some implementations, if the user clicks (484), for example, on a contact in the contact list, a phone number associated with the contact is dialed (488). Otherwise, the user can manually enter a phone number (486) and the phone number is dialed (488).

In some implementations, the universal appliance may include video conferencing hardware (e.g., camera 116). In such implementations, if the called party has video capability (494), then a camera coupled to the universal appliance is turned on (496) and a live video feed of the called party can be displayed on the main panel of the user interface (498). The user can talk on the phone (500) until the user terminates the call by placing the handset back in its cradle or otherwise disconnecting the call (490). When the user terminates the call the Internet phone panel is closed (492) and the workflow 477 returns to the main workflow 400 at step 416 and waits for the next user action.

Television/Internet Video Workflow Example

Figure 4F:
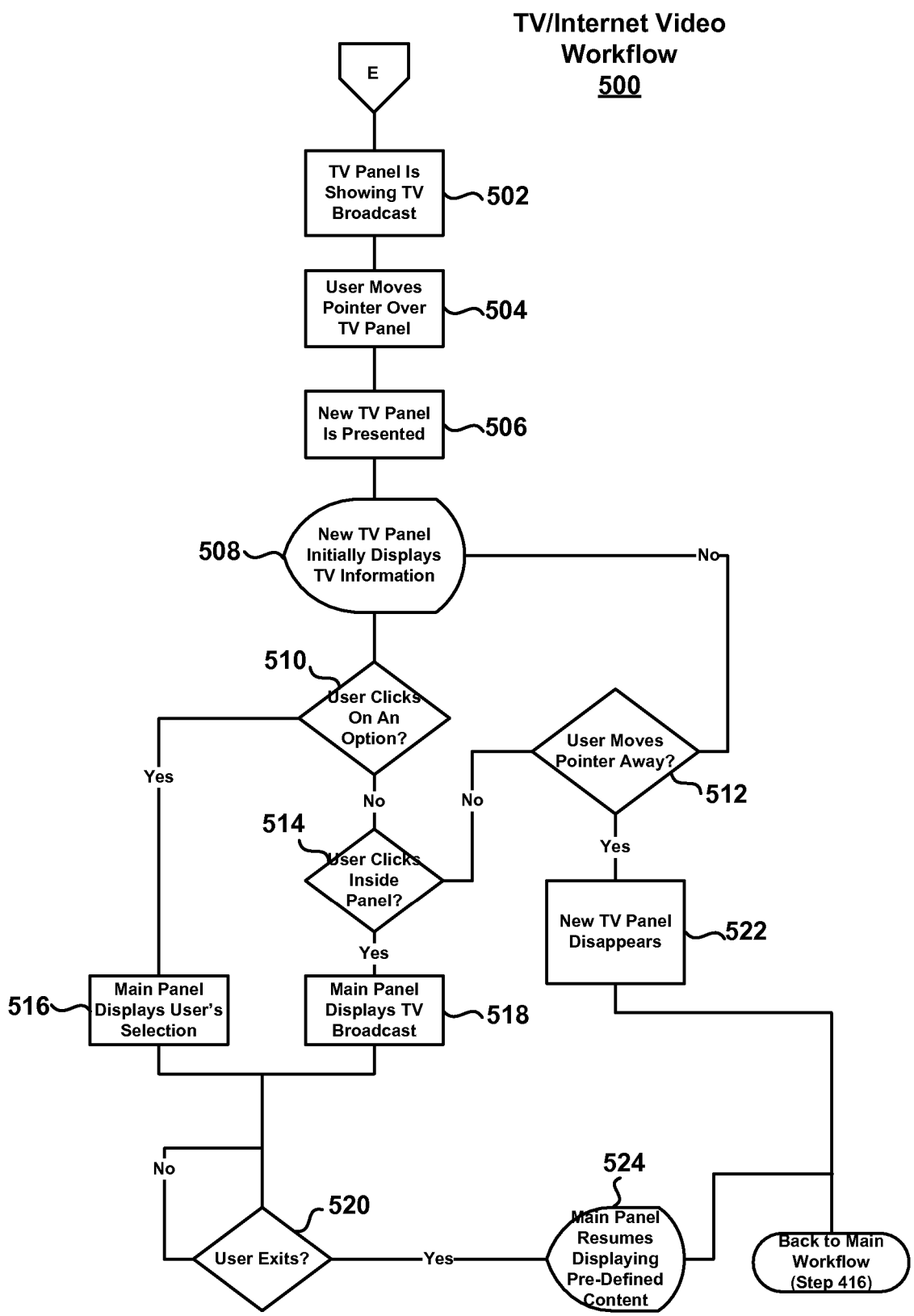

Referring to FIG. 4f, an example of a television/Internet video workflow 500 is shown. In some implementations, the workflow 500 begins with a live television broadcast displayed in a television display panel (e.g., television panel 126) on the user interface of the universal appliance (502). If the user moves a pointer over the television display panel (504), then a new panel is presented (506) for displaying television information (508). Television information can include a choice of recorded shows or Internet videos, and/or live television broadcasts. Personalized information, such as the user's favorite shows can also be displayed in the television information panel. If the user moves the pointer away from the new panel (512), then the new panel disappears (522) and the television workflow 500 returns to the main workflow 400 at step 416 and waits for the next user action.

If the user clicks an option in the television information panel (510), the main panel of the user interface displays the user's selection (516). If the user does not click an option but instead clicks in the new panel (514), then the main panel in the user interface can display a live television broadcast (518). If the user exits (520), the main panel ceases displaying recorded content or live television broadcasts and resumes displaying predetermined content (524), and the workflow 500 returns the main workflow 400 and waits for the next user action.

Universal Appliance Networks

Figure 5:
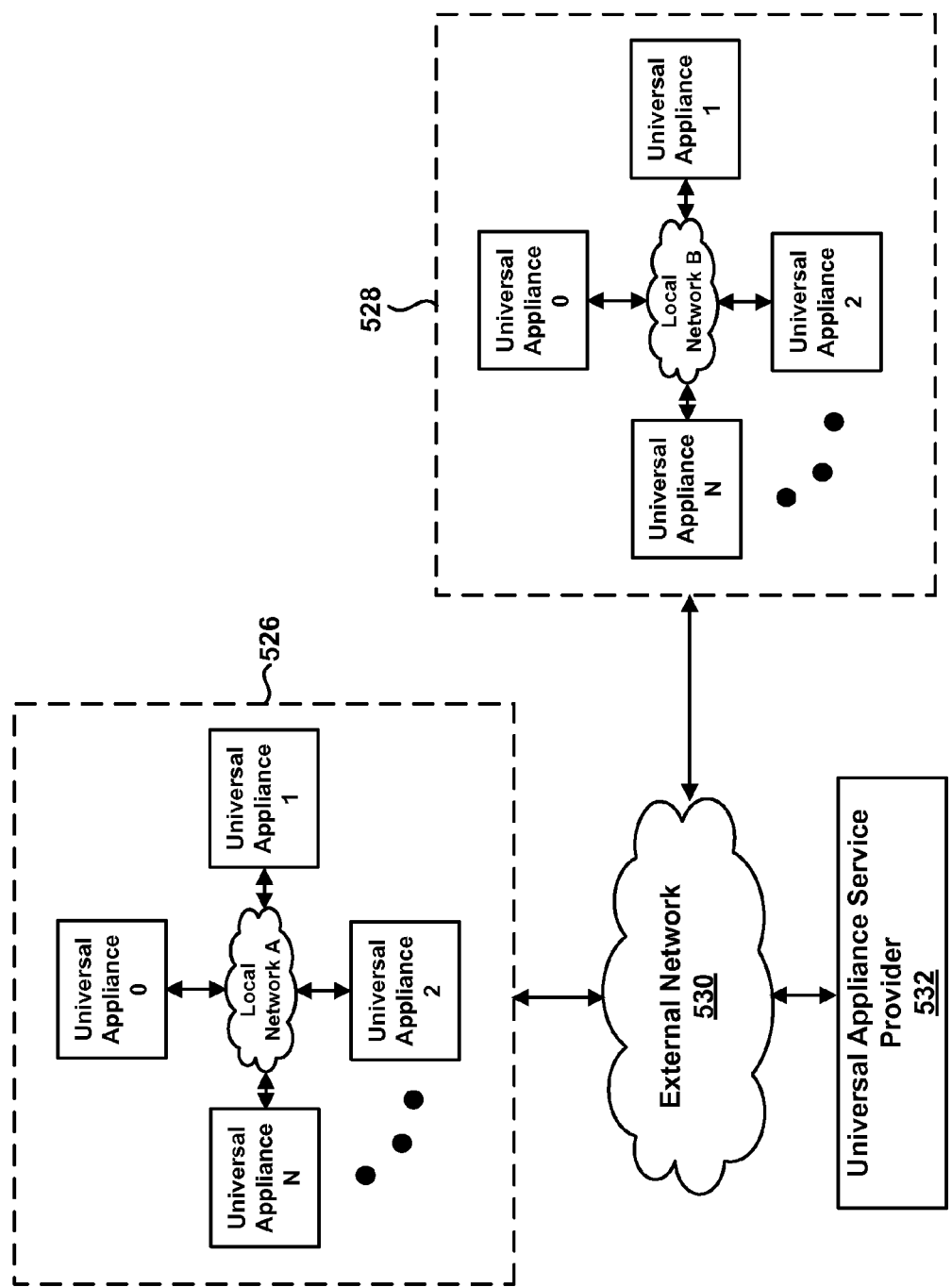
FIG. 5 is a block diagram illustrating exemplary universal appliance networks.

FIG. 5 is a block diagram illustrating universal appliance networks. In some implementations, universal appliances can be part of one or more logical or physical networks, which can be independent from each other or share information (e.g., distributed file sharing). In the example shown, a first network 526 includes multiple universal appliances, which communicate with each other through a local area network A. The local area network A could be, for example, a user's home network. The universal appliances can be located in various locations in the user's home. The universal appliance 1 could be a clock radio. The universal appliance 2 could be a mobile phone, the universal appliance 3 could be a digital image player and so forth. Each of the universal appliances could have its own user interface, which can be customized depending on the functions that are provided by the universal appliance. The universal appliances can each have a host operating system, such as Linux® OS and also include the capability to run Windows® or other proprietary operating systems in a virtual machine.

In some implementations, the local area network 526 can be coupled to an external network 530 (e.g., the Internet, an intranet, wireless network, cable television system, satellite network), which can also be coupled to a second local area network 528 and a universal appliance service provider 532. The second local area network 528 can be another home network, a network at the user's workplace, etc. The second local area network 528 can include multiple universal appliances that communicate through a local area network B.

The configuration shown in FIG. 5 is an example of the various network configurations that can be formed using universal appliances. Other configurations are possible. Generally, universal appliances can be networked in the same manner as personal computers, and use the same network communication technologies and protocols (e.g., Ethernet, TCP/IP). The universal appliances can be both clients and servers in that each universal appliance can serve information to other universal appliances or can request information from other universal appliances or from network devices on the external network 530. The server functions can be performed as background processes, so that they are transparent to the user. The server processes can be operated continuously, on a scheduled basis or in response to a trigger event (e.g., requests from another universal appliance or from a network device).

An important feature of the network configuration shown in FIG. 5 is the universal service provider 532. In some implementations, the delivery, installation and management of software on universal appliances is performed by the universal appliance service provider 532. Such an implementation can free the user from the technical details associated with managing software and networks. The universal appliance service provider 532 could offer, for example, a subscription service. The universal appliances can be "dumb" devices in that there is no native operating system or applications installed on the universal appliances. A user can subscribe to the subscription service and select one or more fixed functions and virtual machines from a set of fixed functions and virtual machines offered by the service provider 532. The service provider 532 can then deliver the functions and virtual machines to the target universal appliance, perform an automatic installation and invoke a monitoring process (e.g., daemon process). In some implementations, the service provider 532 provides storage backup and restoration services for universal appliances.

The monitoring process could detect trigger events in the universal appliance and respond with a suitable action. For example, if the user makes a configuration change, the monitoring process running on the universal appliance can detect the change and send the configuration change to the service provider 532. The service provider 532 can store a copy the current configuration for a universal appliance, so that updates, upgrades and other services can be tailored to the current configuration. The service provider 532 can perform updates and/or upgrades to universal appliances in a transparent manner using, for example, push technology.

An advantage provided by the universal appliance service provider 532 is that the user does not have to participate in the delivery, installation and management of software on the universal appliance. With conventional personal computers, the user would have to request and initiate downloads from a software vendor through a web application (e.g., a browser) and supervise the installation, which can be time consuming and complicated for novice users.

Portable Storage Device Coupled to a Universal Appliance

Figure 6:
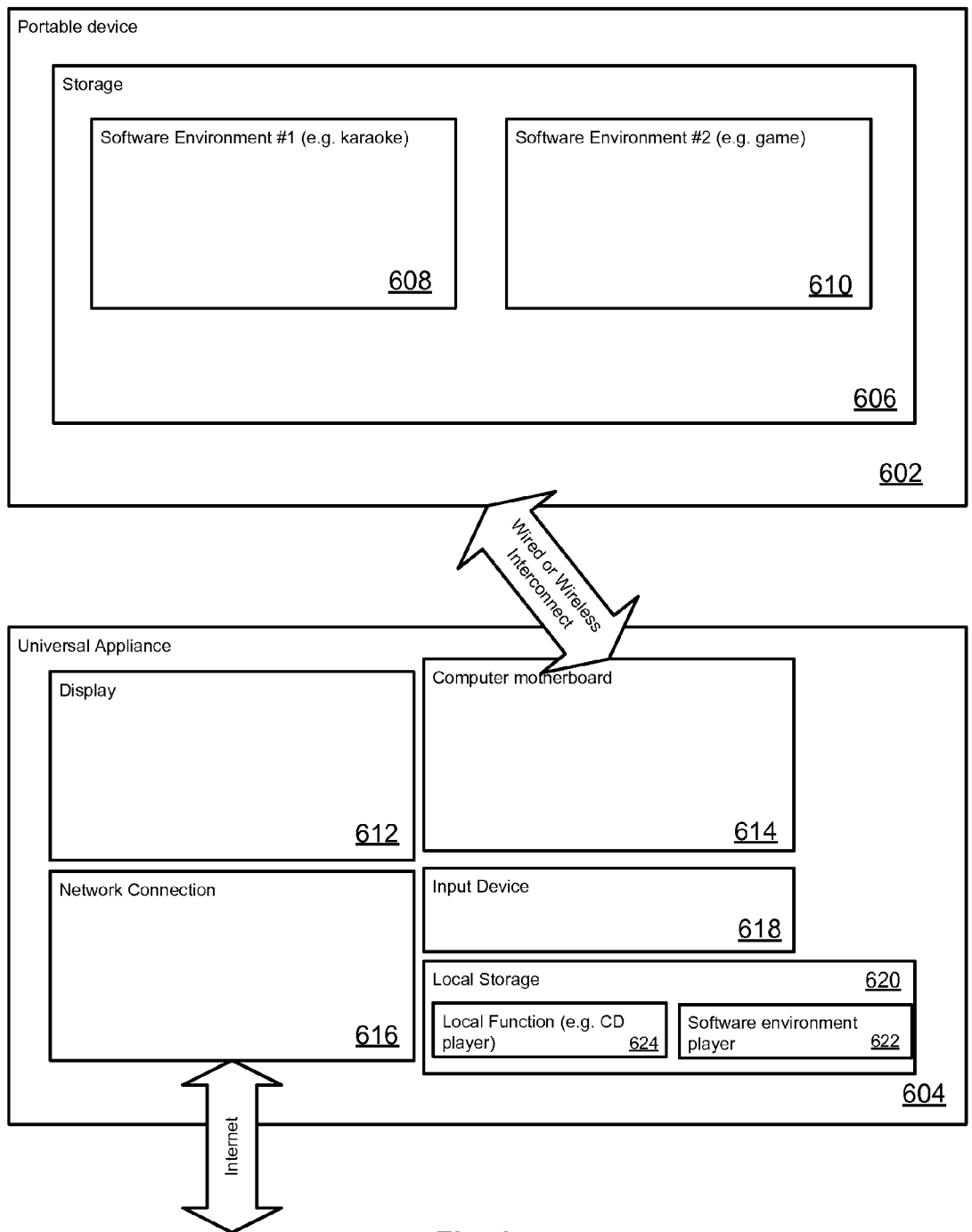
FIG. 6 is a block diagram illustrating an exemplary portable device coupled to a universal appliance.

FIG. 6 is a block diagram illustrating an exemplary portable device 602 coupled to a universal appliance 604. The portable device 602 can be coupled to the universal appliance 604 through a wired or wireless connection. For example, the portable device 602 can be a USB storage device coupled to a USB port of the universal appliance 604. Other types of connections are possible (e.g., FireWire®, Ethernet, Bluetooth, Wi-Fi, WiMax, 3G). The universal appliance 604 can also include a network connection 616 (e.g., Internet, Ethernet, wireless).

Example Structure

The universal appliance 604 can be a host device that hosts or runs one or more software environments 608, 610, stored on the portable device 602. The universal appliance 604 can be a television, a set-top-box, an entertainment system in a car, or a computer at an internet cafe, kiosk, library, or hotel room. The universal appliance 604 will generally have a standard set of functions. For example, a television can be used for watching video. The entertainment system in the car can play CDs or DVDs. The computers can provide a web browser.

The portable device 602 can include storage media 606 (e.g., flash memory) for storing the one or more software environments 608, 610. The portable device 602 can be a USB flash drive, a cell phone, an Ultra-Mobile PC, generally any device capable of storing data and being removably coupled with a computer.

In the example shown, the software environments 608, 610, are task specific. For example, the software environment 608 could provide a karaoke function. The software environment 610 might be for teleconferencing or gaming or synchronized slide show. Alternatively, the software environments 608 and/or 610, can be a general PC operating system running an application (e.g., Microsoft® Office) and a browser, which a user can use to perform productivity tasks. Some portable devices may contain multiple software environments. In that case, the software on the universal appliance 604 can present a list of software environments to the user on display 612 to allow the user to choose one from the list using an input device 618 (e.g., a mouse, touch-sensitive display).

In some implementations, the software environments include virtual machines suitable for execution on a virtual machine monitor. A virtual machine monitor could be VMware® Player, Microsoft® Virtual PC®, or Parallels Desktop®, for example.

In some implementations, the software environments include Java or .NET applications suitable for execution on a Java™ runtime or a .NET runtime.

In some implementations, the software environments are written to a native operating systems interface, like Win32, and packaged and virtualized using OS-level virtualization techniques such as those by Thinstall™, Altiris™ SVS, Ceedo™, or Mojopac™.

In the text that follows, we will refer to the virtual machine monitor, Java runtime, .NET runtime, or OS-level virtualization support software as the "platform player" as distinct from the "software environment player", which encompasses additional features.

Example Hardware Implementation

In some implementations, the universal appliance 604 can include a PC motherboard 614. The motherboard 614 can include I/O interfaces for communicating with the network 616 (e.g. Ethernet, Wi-Fi, 3G), display 612 (e.g. Digital Visual Interface (DVI), High-definition Multimedia Interface (HDMI)), input device 618 (USB, USB wireless), and the portable device 602. An example of such a motherboard is a mini-ITX form factor motherboard, such as iGoLogic, Inc.'s MB13899-F Socket 478 Intel 945GM Mini ITX Intel Motherboard, coupled with a mini-PCI Wi-Fi adapter, such as the Novatech NV-922W, and a standard antenna. A small form factor hard drive, like a 40 GB 2.5" hard disk, or a flash disk, like a Hagiwara Systems IDE Drive On Module, are used to store software and settings.

In some implementations, the universal appliance 602 is a television. In some implementations, the core circuitry to the TV is on a separate system board. In some implementations, the digital audio out and video out of the motherboard are attached to a digital input and a video input on the system board. In some implementations, a bus (e.g., 12C™ bus) is used to signal to the TV firmware that the computer wishes its input to be displayed.

In some implementations, the universal appliance 604 is a set-top box. In some implementations, the set-top box has an HDMI output that connects to the TV. In some implementations, an external IR box (e.g., the USB-UIRT, publicly available at usbuirt.com) can be used by the set-top box to control the TV.

In some implementations, the input device 618 is received through a wired or wireless keyboard and mouse. In some implementations, the display 612 is a touchscreen and an on-screen keyboard and touch are used for data entry.

In some implementation, the Internet connection is an Ethernet connection which will be plugged into an Internet gateway. In some implementations the Internet connection is a Wi-Fi link. In some implementations, such as the car or limousine, the Internet connection is provided by a 3G mobile broadband card, such as the Novatel™ Wireless Ovation U720.

Example Software

In some implementations, a host operating system runs on universal appliance 604. Some examples of host operating systems include Microsoft Windows®, Apple Mac OS X®, or Linux™ operating systems. These operating systems, together with other software can be installed on flash memory or other permanent storage (e.g. a hard disk), as described in reference to FIG. 6. In some implementations, the host operating system is preinstalled on the universal appliance 604.

A platform player can be installed on the host operating system of the universal appliance 604. The operating system can be preinstalled or available as an add-on after purchase of the universal appliance 604. The portable storage device 602 can contain one or more software environments. A software service can scan the portable storage device 602 for compatible software environments when the storage device 602 is attached to the universal appliance 604. For example, a software service can scan a file containing a directory of software environment that the user has stored on the portable storage device 602. The platform player could be part of a virtual appliance transceiver, such as described in U.S. Pat. No. 7,373,451, for "Cache-Based System Management Architecture With Virtual Appliances, Network Repositories, and Virtual Appliance Transceivers." In some implementations, the virtual appliance transceiver can perform several tasks, including but not limited to: 1) updating a software environment to a new version published by a publisher; 2) backing up modifications to a software environment, like user documents and settings, to the network; and 3) dynamically retrieving parts of a software environment that are not resident on the portable storage device 602.

On a Windows® machine, for example, a storage integrator software waits for a USB key to be inserted in a port of the universal appliance 604 or a wireless storage device 602 to come into range of a wireless transceiver installed on the universal appliance 604. When the key is inserted or the wireless storage device 602 is in range, the universal appliance 604 can be scanned by a service for attached storage devices 602. If none are found, the software waits until a WM_DEVICECHANGE message is received. After the WM_DEVICECHANGE message is received, the software rescans for any storage devices 602 that have been added or removed. Windows® will automatically mount any file system on a compatible storage device 602.

On a Linux™ machine, for example, the storage integrator software can scan for block storage devices. Since a Linux™ kernel does not automatically mount file systems, the storage integrator software may try to mount unmounted partitions and look for compatible virtual machines. In some implementations, the storage integrator can poll periodically (e.g. every 5 seconds) for added or removed storage devices 602. Alternatively, on Linux™, instead of just polling, the integrator can be notified of device adds and removes using a script that sends a message to, for example, a UNIX domain socket on which the storage integrator software waits for messages. On a Linux™ distribution with a Hardware Abstraction Layer (HAL) (publicly available from www.freedesktop.org), the storage integrator can enumerate attached storage devices 602 with mountable volumes and receive notification when new mountable storage devices are attached to, or detached from, the universal appliance 604. The volume device objects in the HAL namespace can even be instructed to mount a file system. In this configuration, the storage integrator software can connect to a "d-bus" message bus, as described in the publicly available D-BUS and HAL specifications.

In the some implementations, the storage integrator software can look at the mounted file system and look for a well-known file. Alternatively, the software can do a recursive directory search, looking for known software environments. For example, to look for a VMware® virtual machine, it can look for directories containing one or more files with a .vmx extension and/or one or more files with .vmdk extensions. One way to implement a well-known file is using Outline Processor Markup Language (OPML), Extensible Markup Language (XML) format.

In some implementations, each entry in a list of virtual machines can correspond to an outline tag entry. The text attribute of the outline tag can be a short description. An optional thumbnail attribute would point to an image file (PNG or JPG format) which is displayed to identify the virtual machine. An xmlUrl attribute of the outline tag can point to the virtual machine. A type attribute can include a MIME type describing what sort of software environment it is (e.g. VMware® virtual machine versus Java). In some implementations, the type can be determined by the extension of the files associated with the software environment (e.g. .vmx vs. jar).

If the portable storage device 602 includes wireless connectivity, the user may want to specify which of a potential number of universal appliances 604 to mate with the portable storage device 602. The Wireless USB specification (publicly available at usb.org) specifies that this specification can be done using a wired USB connection, or by entering a number on a display of the USB device into a host operating system. If a portable storage device 602 is associated with multiple universal appliances 604, the portable storage device 602 can select which appliance to associate with when multiple appliances 604 are in range.

In some implementations, the software environment starts immediately after the coupling of the portable device 602 and the universal appliance 604. In some implementations, the user is presented the option of starting one or more software environments on the portable device.

In some implementations, the "storage integrator" checks to see if a software environment should be automatically started. In some implementations, this is done by checking an attribute associated with the software environment. In some implementations, the OPML file could have an additional attribute (autostart) which would have a value of "true" to indicate auto-start. In some implementations, a setting in the software environment's configuration file or in a file in the same directory as the configuration file indicates that the software environment should be autostarted on launch.

When the device is decoupled, in some implementations, the storage integrator will give the user the option of recoupling the device in case it was accidentally removed. In some implementations, the option is time limited. After decoupling, the operating system may have invalidated all of the open files. A shim library, placed between the system call interface and the application, can transparently reopen the files when the storage is reconnected. The shim library can keep a table from the original invalidated file handle to the new reopened handle. If writes to the storage are not synchronous, the shim library can log writes that have not been flushed for certain so they can be reapplied when the device is reconnected. Memory-mapped files present a challenge to this technique and applications that memory map files from portable storage may experience failures. In some implementations, the universal appliance, by design, either does not have any applications that memory map files from portable storage or has applications that can tolerate the disappearance of those memory mappings.

After decoupling and the expiration of any opportunity to recouple, in some implementations, the storage integrator will clean up the software environment by killing all processes spawned to run it, including the platform player. In some implementations, once the processes are terminated, data associated with the virtual machine is deleted off of the universal appliance.

Buying Software Environments from a Store

In some implementations, a user can purchase or subscribe to additional software environments from a web store or other network resource. In some implementations, a software environment player 622 in local storage 620 of the universal appliance 604 embeds a web browser, such as Internet Explorer™ or Firefox™, that enables the user to visit web stores or other network resources. In some implementations, the player 622 uses a plug-in to handle a MIME-type associated with the software environment. In some implementations, the player uses a mime type handler registered with the operating system. In some implementations, each copy of the player has credentials, e.g. a unique identifier and a password, to uniquely and securely identify itself to the network services associated with the web store.

In some implementations, a web store records the user's purchase or subscription in a database. In some implementations, the initial file downloaded from the web store is a signed statement, called a "purchase receipt" indicating the user's right to access purchased content. In some implementations, the statement is an XML file. In some implementations, the content is identified by a URL located in the XML file. In some implementations, the statement includes an identifier uniquely identifying the purchase, called the "license ID." In some implementations, the signature is an XML digital signature.

In some implementations, a public key of the web store or a certificate authority of the web store is embedded in the software environment player 622 so it can verify the statement. The software environment player 622 downloads the files that make up the purchased software environment over, for example, HTTP. In some implementations, the software environments can be protected using a digital rights management system (DRM) such as Microsoft® Windows® Media DRM 10.0 or Apple Inc.'s FairPlay®. In some implementations, the files of the software environment are encrypted using a block cipher such as AES-256-CBC in a fashion similar to TrueCrypt™ (publicly available at truecrypt.sf.net) to enable demand paging. In some implementations, a license to run the software environments is tied to the portable device 602 or a limited number of devices. In some implementations, the software player will request authorization from a license management service to run the environment from the portable device 602 using, for example, a protocol like HTTP/SSL to send to request, formatted in XML, asking to use the license ID with the portable device 602. The license management service will reply either accepting the request or rejecting it with an error that can be shown to the user. In some implementations, the portable device 602 is identified in the protocol exchanges by an immutable, unique identifier, like a serial number, that is placed in the firmware of the device during manufacture. In some implementations, the license management service will return a signed statement that authorizes the software environment to be used on the portable device 602. In some implementations, the signed statement is time limited and called a "lease." In some implementations, the player 622 will refuse to run the software environment if there is no signed statement from an accepted license management service. In some implementations, the player 622 stores the authorization on the portable device 602 to reduce the number of requests against the license management service.

In some implementations, the license management service limits the user to a certain number of concurrent sessions of that software environment. In some implementations, the player 622 attempts to contact a network license management service before running the software environment to get a license for the session. The license management server will keep track of the number of concurrent sessions in the database. If there are enough sessions available, the license management service may return a signed statement giving the player the right to run the environment for a certain amount of time called a "lease." If the number is too high, the license management service may reject the new. Alternately, it may revoke another player's session. When the other player goes to renew its session, it will be informed of the revocation and stop running the environment.

In some implementations, the user subscribes to a software environment. To disable the software after the subscription period has ended, the software environment can be associated with a lease.

In some implementations, the leases mentioned above have expiration times that the player 622 checks and the player 622 will not run software environments with expired leases. In some implementations, before the license expires, the player 622 will try to renew the lease (e.g., periodically). In some implementations, the player 622 will refuse to play the software environment if no lease is available.

In some implementations, the lease is stored in a separate file in the same directory as the software environment. The player 622 can check if the lease has expired by comparing the lease expiration time to the current time. If the player 622 is on-line, the player 622 can check the time against a network time service. If the player 622 is on-line, the player 622 can renew the lease with license management service. In some implementations, the player 622 will automatically start trying to renew the lease at a predetermined point (e.g., half-way) into its term. The license management service is connected to the subscription database. In some implementations, the license management service will not generate a lease past the end of the user's subscription period. In some cases, to revoke access sooner, the lease issued by the license management service may be shorter than the user's subscription period.

In some implementations, data associated with the software environment is periodically backed up to a network backup service. This backup can be done by periodically scanning the files associated with the software environment, checking the modification time, and uploading the modified files to a network backup service whose Domain Name Server (DNS) name is embedded in the software environment. In some implementations, the player uses the license ID of the software environment as well as the credentials of the player or user to retrieve from the license management service a ticket to authenticate the software environment to the backup service. The license management service and backup service share a secret that was set up through some channel between the administrators of the backup service and the license management service (e.g. by e-mail or phone call). The tickets have an expiration time so that de-authorized devices cannot keep using services. This can be implemented in a way analogous to the ticket servers in Amazon's S3 storage service.

In some implementations, the backup software identifies itself to the network backup server using the license ID of the software environment and the ticket, which is passed into the software environment using a mechanism such as the VMware® guest variable mechanism, for example.

In some implementations, the data associated with the software environment is stored on a virtual disk, and a periodic snap-shot of the data can be sent by the player 622 to a network backup service. In some implementations, the player 622 uses the license ID and ticket to identify the specific software environment to the network backup server.

Restoring Software Environments onto a New Device

When users lose or upgrade their portable devices, they may wish to restore their environments onto the new device. In some implementations, the web store can contain a record of the user's software environment purchases and subscriptions. In some implementations, the user can browse to a "My Purchased Software Environments" page, or similar page, with their purchased software environments. In some implementations, the user clicks on a purchased software environment and clicks a restore button. In some implementations, the web store will initiate the download of a software environment to the new device.

When the software player 622 requests authorization for the new device, the license management service will return to the software player 622 a warning that another device has authorization and the maximum allotment has been achieved. In some implementations, the user will be given the option of whether to continue with the restore or whether to de-authorize another device. If the user chooses to de-authorize another device, the license management service is instructed by the player 622 to de-authorize that device. The player 622 can then try to authorize the new device.

When the software environment is run for the first time, a backup service in the software environment will contact a backup network service with the license ID. In some implementations, the restore code in the software environment authenticates itself using a ticket retrieved from the license management service as was done for backup. In some implementations, if an existing backup is found, it automatically initiates a restore in the background. In some implementations, if an existing backup is found, the user is prompted whether the user wishes to restore. In some implementations, to provide a more immediate experience, the network service can be used as a network file system (e.g., such as Coda) or database (such as MySQL®) and information can be demand fetched upon request of the software in the software environment.

In some implementations, virtual disks can be used to store the data associated with a software environment. In some of those implementations, the player 622 can initiate the restore. In some implementations, the software environment can run before all the blocks of the virtual disk have been fetched and any missing blocks are demand fetched as the software environment requests the blocks. Various modifications may be made to the disclosed implementations and still be within the scope of the following claims.

What is claimed is:

1. A method for providing a general-purpose computing function at a fixed-function consumer electronics (CE) device, comprising:
    obtaining a virtual machine at the fixed-function CE device, wherein the fixed-function CE device includes hardware, a host operating system, a host user interface, a virtual machine monitor to execute virtual machines, and a set of fixed-functions that does not include a virtual machine monitor that is capable of executing virtual machines, wherein the host operating system interacts directly with the hardware, wherein the host user interface interacts directly with the host operating system, wherein the set of fixed-functions interact directly with the host user interface, wherein the virtual machine monitor interacts directly with the host user interface, wherein the fixed-function CE device allows a user to directly interact with the set of fixed-functions, but does not allow the user to directly interact with the host user interface, wherein the set of fixed-functions includes a television function, and wherein the set of fixed-functions do not include a general purpose computing function;
    executing the virtual machine on the virtual machine monitor of the fixed-function CE device, wherein the virtual machine supports a general-purpose computing function, wherein the executing virtual machine provides the general purpose computing function, and wherein the fixed-function CE device allows the user to directly interact with the virtual machine executing on the virtual machine monitor; and
    providing the set of fixed-functions and the general-purpose computing function to the user.

2. The method of claim 1, wherein obtaining the virtual machine at the fixed-function CE device includes reading the virtual machine from a portable storage medium attached to the fixed-function CE device.

3. The method of claim 1, wherein obtaining the virtual machine at the fixed-function CE device includes receiving the virtual machine over a network coupled to the fixed-function CE device.

4. The method of claim 1, wherein the fixed-function CE device is a television.

5. The method of claim 1, wherein the fixed-function CE device is a set-top box.

6. The method of claim 1, wherein the fixed-function CE device is a game console.

7. The method of claim 1, wherein the virtual machine includes an operating system.

8. The method of claim 7, wherein the operating system is a version of a Windows® operating system.

9. The method of claim 7, wherein the operating system is a version of a Mac OS® operating system.

10. A fixed-function consumer electronics (CE) device, comprising:
   one or more processors; and
   a non-transitory computer-readable storage medium storing instructions that, when executed by the one or more processors, cause the fixed-function CE device to perform a method for providing a general-purpose computing function, the method comprising:
      obtaining a virtual machine at the fixed-function CE device, wherein the fixed-function CE device includes hardware, a host operating system, a host user interface, a virtual machine monitor to execute virtual machines, and a set of fixed-functions that does not include a virtual machine monitor that is capable of executing virtual machines, wherein the host operating system interacts directly with the hardware, wherein the host user interface interacts directly with the host operating system, wherein the set of fixed-functions interact directly with the host user interface, wherein the virtual machine monitor interacts directly with the host user interface, wherein the fixed-function CE device allows a user to directly interact with the set of fixed-functions, but does not allow the user to directly interact with the host user interface, wherein the set of fixed-functions includes a television function, and wherein the set of fixed-functions do not include a general purpose computing function;
      executing the virtual machine on the virtual machine monitor of the fixed-function CE device, wherein the virtual machine supports a general-purpose computing function, wherein the executing virtual machine provides the general purpose computing function, and wherein the fixed-function CE device allows the user to directly interact with the virtual machine executing on the virtual machine monitor; and
      providing the set of fixed-functions and the general-purpose computing function to the user.

11. The fixed-function CE device of claim 10, wherein obtaining the virtual machine at the fixed-function CE device includes reading the virtual machine from a portable storage medium attached to the fixed-function CE device.

12. The fixed-function CE device of claim 10, wherein obtaining the virtual machine at the fixed-function CE device includes receiving the virtual machine over a network coupled to the fixed-function CE device.

13. The fixed-function CE device of claim 10, wherein the fixed-function CE device is a television.

14. The fixed-function CE device of claim 10, wherein the fixed-function CE device is a set-top box.

15. The fixed-function CE device of claim 10, wherein the fixed-function CE device is a game console.

16. The fixed-function CE device of claim 15, wherein the virtual machine includes an operating system.

17. The fixed-function CE device of claim 16, wherein the operating system is a version of Windows® operating system.

18. The fixed-function CE device of claim 16, wherein the operating system is a version of Mac OS® operating system.

19. A non-transitory computer-readable storage medium storing instructions that, when executed by a fixed-function consumer electronics (CE) device, cause the fixed-function CE device to perform a method for providing a general-purpose computing function, the method comprising:
   obtaining a virtual machine at the fixed-function CE device, wherein the fixed-function CE device includes hardware, a host operating system, a host user interface, a virtual machine monitor to execute virtual machines, and a set of fixed-functions that does not include a virtual machine monitor that is capable of executing virtual machines, wherein the host operating system interacts directly with the hardware, wherein the host user interface interacts directly with the host operating system, wherein the set of fixed-functions interact directly with the host user interface, wherein the virtual machine monitor interacts directly with the host user interface, wherein the fixed-function CE device allows a user to directly interact with the set of fixed-functions, but does not allow the user to directly interact with the host user interface, wherein the set of fixed-functions includes a television function, and wherein the set of fixed-functions do not include a general purpose computing function;
   executing the virtual machine on the virtual machine monitor of the fixed-function CE device, wherein the virtual machine supports a general-purpose computing function, wherein the executing virtual machine provides the general purpose computing function, and wherein the fixed-function CE device allows the user to directly interact with the virtual machine executing on the virtual machine monitor; and
   providing the set of fixed-functions and the general-purpose computing function to the user.

20. The non-transitory computer-readable storage medium of claim 19,
   wherein the fixed-function CE device is one of: a television, a set-top box, or a game console, and
   wherein the virtual machine includes an operating system that is one of: a version of Windows® operating system or a version of Mac OS® operating system.

* * * * *